Patented Feb. 28, 1939

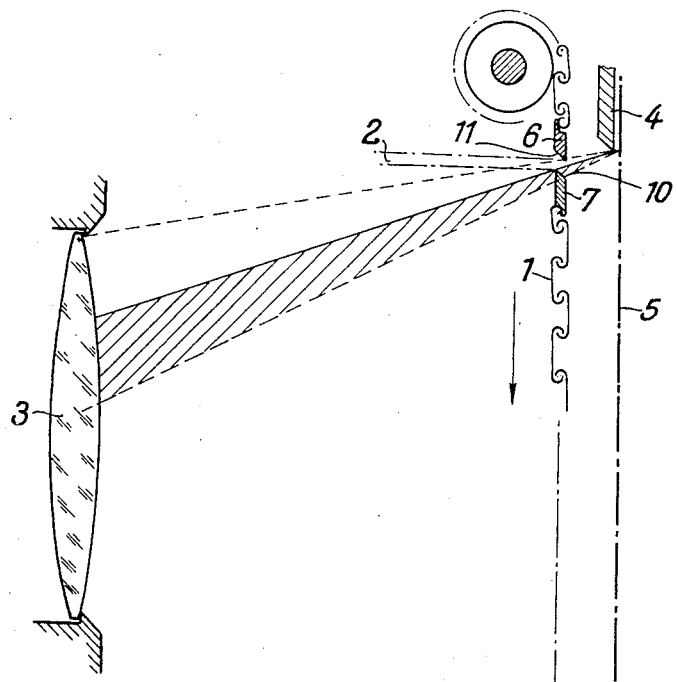
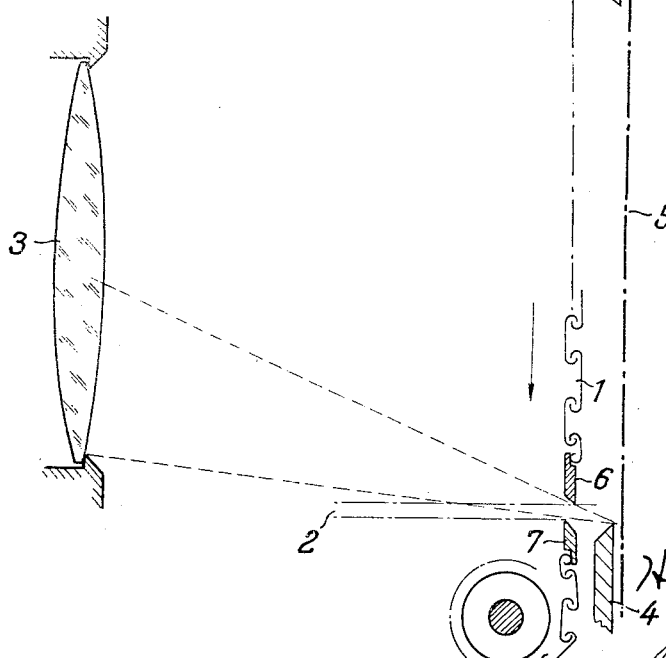

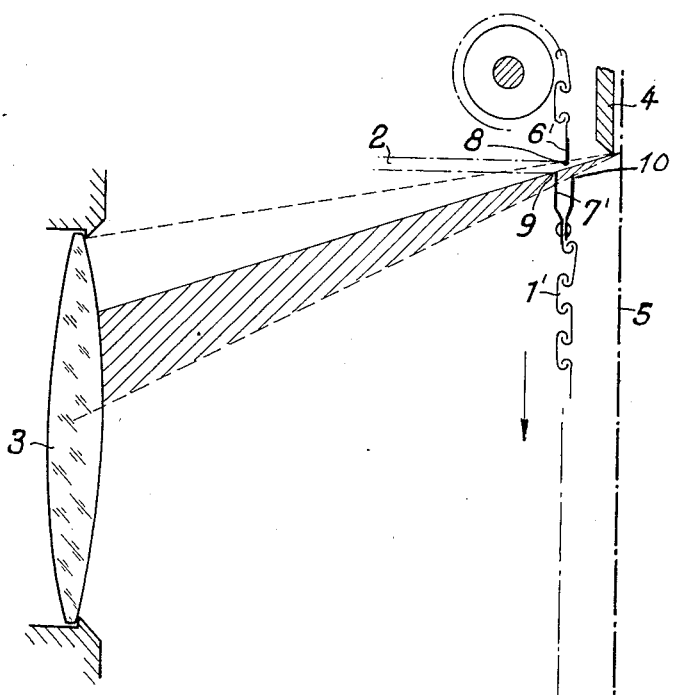
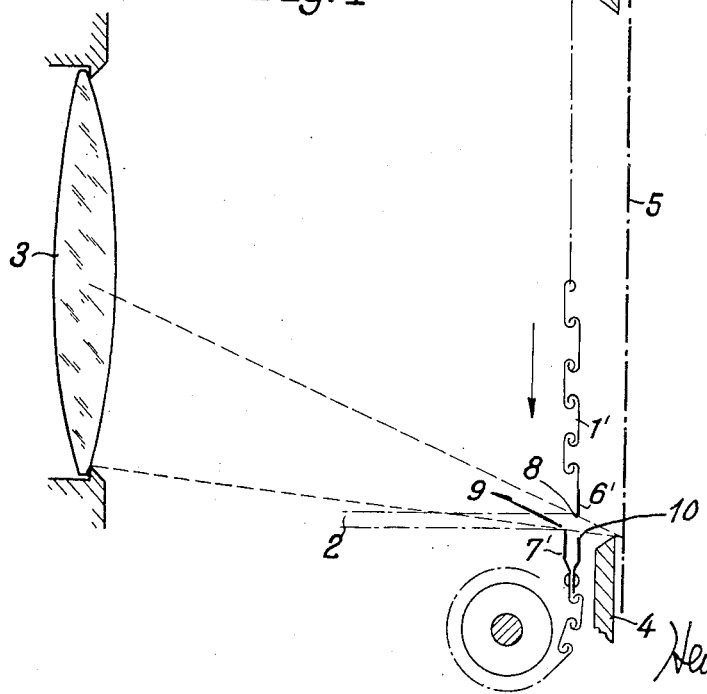

2,149,094

UNITED STATES PATENT OFFICE 2,149,094

PHOTOGRAPHIC FOCAL PLANE SHUTTER

Heinz Küppenbender, Dresden, Germany, assignor to Zeiss Ikon Aktiengesellschaft, Dresden, Germany Application August 11, 1937, Serial No. 158,605
In Germany August 12, 1936

6 Claims. (Cl. 95—57)

As is known, the running down of the curtains forming the slit of a photographic focal plane shutter takes place non-uniformly. This is due to the fact that the running-down curtain has an acceleration which is greater the greater is the speed to which the shutter is adjusted. As a consequence of the non-uniform running-down of the shutter the illumination of the light sensitive material must likewise vary at the various parts successively traversed by the shutter. In order to remove this disadvantage the slit width has been varied during running-down of the shutter. Such arrangements are however complicated and expensive.

Further, in the case of a focal plane shutter having concealed winding the curtains have been allowed to run down one after the other with acceleration without mechanical limitation of the slit widening, and for this purpose the spring of the second curtain has been given a greater initial tension than the spring of the first curtain, but a smaller tension displacement under equal conditions. Such a mode of construction cannot ensure the continuance of a uniform slit width, since on the one hand it is extremely difficult to manufacture springs of a quite definite elasticity and since furthermore in operation the springs do not retain the desired elasticity but exhibit fatigue phenomena which adversely affect their accurate operation.

The subject of the invention is a photographic focal plane shutter in which the non-uniformity of exposure caused by the accelerated running-down of the curtains is removed by a definite shape of the curtain borders, this shape being so selected that the light-limiting edge of the curtain which runs down first is at a greater distance from the picture plane than the light-limiting edge of the curtain following it at an invariable distance. Preferably the parallel cut-off surfaces of the curtain borders are inclined with respect to the picture plane. Also the one curtain border can have the shape of a U with unequal legs and be so arranged that the leg thereof further from the picture plane follows, with its effective edge, after the end edge of the other leg in the direction of movement of the shutter, whilst the other curtain border engages, with its effective edge, between the legs of the U when the shutter is closed.

Two embodiments by way of example of the subject of the invention are illustrated by way of example in the drawings, Figure 1 shows diagrammatically a focal plane shutter in which the curtain borders have cut-off surfaces extending inclined to the direction of running-down, shortly after opening of the shutter, Figure 2 shows a similar shutter shortly before it closes again, Figure 3 illustrates a focal plane shutter having a U-shaped curtain border, just at the commencement of the exposure, Figure 4 shows the same focal plane shutter towards the end of the exposure.

In the embodiment according to Figs. 1 and 2 the slit 2 of the shutter 1 is formed by two cut-off borders 6, 7 of the two curtains, the parallel cut-off surfaces 10, 11 of which are inlined with respect to the picture plane. From the objective 3 the light falls through the picture window 4 on to the light-sensitive material 5. The curtain borders are so formed that the light-limiting edge 7 of the first running-down curtain 1 is at a greater distance from the picture plane than the light-limiting edge of the curtain border 6 which follows it at an invariable distance.

In the embodiment according to Figs. 3 and 4 the light rays proceeding from the object to be taken fall through the objective 3 and the slit 2 on to the light-sensitive material 5 displaceable behind the picture window 4. The one curtain border 7' of the focal plane shutter 1' has the shape of a U having unequal legs. The light-limiting edge 9 of the leg of the curtain border 7' furthest away from the picture plane follows the end edge 10 of the other leg in the direction of movement of the shutter. The other curtain border 6', when the shutter is closed, engages with its effective edge 8 between the legs of the U-shaped curtain border 7' and thereby provides a light-tight closure of the curtain. It accordingly lies closer to the picture plane than the effective edge of the shutter border 7' and thereby provides an effect like that produced in the case of the embodiment according to Figs. 1 and 2.

Since the light-cone is screened to a greater extent at the commencement of the exposure, that is, with the shutter curtains running down proportionately slowly, than towards the end of the exposure period, when the exposure curtains run rapidly, there is obtained an approximately uniform exposure over the whole width of the picture window.

I claim:

1. A focal plane shutter for photographic cameras, including a movable shutter member which is accelerated during the exposure, said shutter member comprising two serially arranged curtains having their adjacent ends spaced from each other to form a non-variable exposure slot therebetween, a rigid bar attached on each said end of the curtains, the opposing edge faces of said bars being parallel to each other and inclined with respect to the focal plane of the camera, the outermost edge of the leading curtain being farther away from the said focal plane than the outermost edge of the following curtain so that the effective width of the exposure slot is gradually increased when the shutter is operated.

2. A focal plane shutter for photographic cameras, including a movable shutter member which is accelerated during the exposure, said shutter member comprising two serially arranged curtains forming between the adjacent ends thereof an exposure slot, the leading curtain having a U-shaped bar attached to the end which forms one edge of said exposure slot and the other curtain has a marginal bar attached to the end forming the other edge of said exposure slot, said marginal bar being positioned in a plane which lies between the planes in which the legs of said U-shaped bar are positioned, the leg farthest away from the focal plane of the camera being longer than the other whereby the effective width of the exposure slot formed between the outer edges of said bars is gradually changed when the shutter is operated, even though the two curtains are moved in unison, said marginal bar being adapted to enter into the space between the legs of said U-shaped bar on the leading curtain to close thereby said exposure slot.

3. A focal plane shutter for photographic cameras, including a movable shutter member which is accelerated during the exposure, said shutter member comprising two serially arranged curtains forming between the adjacent ends thereof an exposure slot, the leading curtain having a U-shaped bar attached to the end which formes one edge of said exposure slot and the other curtain has a marginal bar attached to the end forming the other edge of said exposure slot, said marginal bar being positioned in a plane which lies between the planes in which the legs of said U-shaped bar are positioned, the leg farthest away from the focal plane of the camera being longer than the other leg of said U-shaped bar, whereby the effective width of the exposure slot formed between the outer edges of said bars is gradually increased when the shutter is released to execute its exposure movement, even though both said curtains are actuated to move simultaneously with the same speed.

4. In a focal plane shutter for photographic cameras, the shutter being of the type in which the curtain is accelerated during the exposure, the combination of a leading curtain section, a second curtain section, the two sections being movable in a single plane parallel to the picture plane of the camera with an exposure slot between them formed by the adjacent end edges of the two sections, the end edge of the leading section at the exposure slot having a greater distance from the picture plane than the end edge of the second curtain section.

5. In a focal plane shutter for cameras, the shutter being of the type in which the curtain is accelerated during the exposure, the combination of a shutter curtain having two sections movable in a single plane parallel to the picture plane of the camera and at equal speed, the two sections being spaced by an exposure slot located in the plane of movement, the end edge of the leading section at the exposure slot having a greater distance from the picture plane at the end edge of the other section of the curtain shutter, the width of the exposure slot being uniform during any operative movement of the shutter.

6. In a focal plane shutter for photographic cameras, the shutter being of the type in which the curtain is accelerated during the exposure, the combination of a curtain having a leading section and a lagging section, both movable in a common plane parallel to the plane of the picture, the two sections being separated by an exposure slot of predetermined width, terminal elements on the curtain sections, between which elements the exposure slot is formed, the terminal elements having light limiting edges, the light limiting edge of the leading section having a greater distance from the picture plane of the camera than the light limiting edge of the lagging section.

HEINZ KÜPPENBENDER.